(12) United States Patent
Huang et al.

(10) Patent No.: US 10,572,741 B2
(45) Date of Patent: Feb. 25, 2020

(54) IMAGE-BASED VEHICLE CLASSIFICATION SYSTEM

(71) Applicant: National Applied Research Laboratories, Taipei (TW)

(72) Inventors: Chung-I Huang, Hsinchu (TW); Chien-Hao Tseng, Hsinchu (TW); Fang-Pang Lin, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 141 days.

(21) Appl. No.: 15/957,473

(22) Filed: Apr. 19, 2018

(65) Prior Publication Data

US 2019/0057260 A1 Feb. 21, 2019

(30) Foreign Application Priority Data

Aug. 17, 2017 (TW) .............................. 106127881 A (51) Int. Cl.
*G06K 9/00* (2006.01)
*G06T 7/194* (2017.01)
*G06K 9/62* (2006.01)

(52) U.S. Cl.
CPC ....... *G06K 9/00785* (2013.01); *G06K 9/6267* (2013.01); *G06T 7/194* (2017.01);
(Continued)

(58) Field of Classification Search
CPC ............. G06K 9/00785; G06K 9/6267; G06K 9/00771; G06K 9/00536; G06K 9/46; G06K 9/4604; G06K 9/4609; G06K 9/00624; G06K 9/4671; G06K 9/52; G06K 9/6256; G06K 9/66; G06K 2009/4666; G06K 2209/23; G06K 2209/15;
(Continued)

(56) References Cited

U.S. PATENT DOCUMENTS 5,434,927 A * 7/1995 Brady .................... G08G 1/015
382/104
7,639,841 B2 * 12/2009 Zhu ..................... G06K 9/00335
340/435

(Continued)

OTHER PUBLICATIONS

Chen, Yanjun et al., "Vehicle Type Classification Based on Convolutional Neural Network", Chinese Automation Congress, IEEE, Oct. 20-22, 2017, pp. 1-4. (Year: 2017).*

(Continued)

*Primary Examiner* — Jose L Couso
(74) *Attorney, Agent, or Firm* — Muncy, Geissler, Olds & Lowe, P.C.

(57) ABSTRACT

An image-based vehicle classification system includes a camera and an image server connected to the camera. The camera captures images of a road to result in an image stream. The image server includes a processor for receiving the image stream from the camera. For each of the images of the image stream, the processor performs image segmentation, a thinning process, an erosion process and a dilation process, and classifies, by a neural network classifier, a vehicle image part contained in the image into one of a large-size car class, a passenger car class and a motorcycle class when it is determined that the vehicle image is crossing an imaginary line set in advance in the image for counting vehicles.

20 Claims, 5 Drawing Sheets

(52) U.S. Cl.
CPC .............. *G06T 2207/20081* (2013.01); *G06T 2207/30236* (2013.01)

(58) Field of Classification Search
CPC  G06T 2207/20081; G06T 2207/30236; G08G 1/015; G08G 1/04; G08G 1/017; G08G 1/0175; G08G 1/054; G06N 3/0454
See application file for complete search history.

(56) References Cited

U.S. PATENT DOCUMENTS

| | | | | |
|---|---|---|---|---|
| 9,514,366 | B2* | 12/2016 | Schweid | G06K 9/00624 |
| 9,514,391 | B2* | 12/2016 | Perronnin | G06K 9/4628 |
| 2003/0011492 | A1* | 1/2003 | Owen | G08G 1/015 |
| | | | | 340/941 |
| 2009/0060279 | A1* | 3/2009 | Hata | G06K 9/00771 |
| | | | | 382/104 |
| 2009/0174575 | A1* | 7/2009 | Allen | G07B 15/063 |
| | | | | 340/933 |
| 2010/0322476 | A1* | 12/2010 | Kanhere | G08G 1/0175 |
| | | | | 382/103 |
| 2014/0037142 | A1* | 2/2014 | Bhanu | G08G 1/015 |
| | | | | 382/103 |
| 2014/0085475 | A1* | 3/2014 | Bhanu | G06K 9/00825 |
| | | | | 348/148 |
| 2016/0042234 | A1* | 2/2016 | Chen | G06K 9/00785 |
| | | | | 382/190 |
| 2016/0140424 | A1* | 5/2016 | Wang | G06K 9/66 |
| | | | | 382/156 |
| 2016/0210512 | A1* | 7/2016 | Madden | G06K 9/00771 |
| 2017/0294118 | A1* | 10/2017 | Chen | G08G 1/017 |
| 2018/0268252 | A1* | 9/2018 | Ueta | G06T 1/00 |

OTHER PUBLICATIONS

Wang, Kuan-Chung et al., "Automatic Vehicle Classification using Center Strengthened Convolutional Neural Network", 2017 Asia-Pacific Signal and Information Processing Association Annual Summit and Conference, IEEE, Dec. 12-15, 2017, pp. 1-4. (Year : 2017).*

Daigavane, P.M. et al., "Vehicle Detection and Neural Network Application for Vehicle Classification", 2011 International Conference on Computational Intelligence and Communication Systems, IEEE, Oct. 7-9, 2011, pp. 758-762. (Year: 2011).*

Dong Zhen et al., "Vehicle Type Classification using a Semisupervised Convolutional Neural Network", IEEE Transactions on Intelligent Transportation Systems, vol. 16, No. 4, Mar. 6, 2015, pp. 2247-2256. (Year: 2015).*

Li, Xiaobin et al., "Automatic Vehicle Classification Based on Video with BP Neural Network", 2008 4th International Conference on Wireless Communications, Networking and Mobile Computing, IEEE, Oct. 12-14, 2008, pp. 1-3. (Year: 2008).*

* cited by examiner

| 6/27 | | | | | 6/28 | | | |
|---|---|---|---|---|---|---|---|---|
| Time | L | M | S | Total | Time | L | M | S | Total |
| 6:15 | 3 | 328 | 415 | 746 | 6:15 | 2 | 328 | 415 | 745 |
| 6:30 | 6 | 384 | 755 | 1145 | 6:30 | 7 | 379 | 708 | 1094 |
| 6:45 | 12 | 451 | 971 | 1434 | 6:45 | 17 | 468 | 970 | 1455 |
| 7:00 | 27 | 799 | 1396 | 2222 | 7:00 | 27 | 861 | 1340 | 2228 |
| 7:15 | 23 | 835 | 1375 | 2233 | 7:15 | 23 | 835 | 1404 | 2262 |
| 7:30 | 28 | 870 | 1455 | 2353 | 7:30 | 20 | 804 | 1468 | 2292 |
| 7:45 | 31 | 833 | 1395 | 2259 | 7:45 | 20 | 821 | 1318 | 2159 |
| 8:00 | 23 | 836 | 1415 | 2274 | 8:00 | 18 | 839 | 1498 | 2355 |
| 8:15 | 20 | 844 | 1465 | 2329 | 8:15 | 18 | 827 | 1337 | 2182 |
| 8:30 | 27 | 870 | 1332 | 2229 | 8:30 | 21 | 852 | 1454 | 2327 |
| 8:45 | 20 | 806 | 1398 | 2224 | 8:45 | 31 | 834 | 1447 | 2312 |
| 9:00 | 26 | 798 | 1456 | 2280 | 9:00 | 16 | 827 | 1438 | 2281 |
| 9:15 | 31 | 787 | 1055 | 1873 | 9:15 | 18 | 756 | 1026 | 1800 |
| 9:30 | 29 | 702 | 1154 | 1885 | 9:30 | 26 | 762 | 1216 | 2004 |
| 9:45 | 20 | 740 | 976 | 1736 | 9:45 | 20 | 662 | 878 | 1560 |
| 10:00 | 30 | 670 | 1077 | 1777 | 10:00 | 18 | 701 | 978 | 1697 |
| 10:15 | 16 | 751 | 933 | 1700 | 10:15 | 15 | 725 | 1034 | 1774 |
| 10:30 | 32 | 760 | 981 | 1773 | 10:30 | 27 | 778 | 863 | 1668 |
| 10:45 | 18 | 767 | 1346 | 2131 | 10:45 | 21 | 774 | 899 | 1694 |
| 11:00 | 22 | 821 | 1039 | 1882 | 11:00 | 28 | 744 | 1230 | 2002 |
| 11:15 | 18 | 752 | 1143 | 1913 | 11:15 | 27 | 735 | 1007 | 1769 |
| 11:30 | 27 | 821 | 1174 | 2022 | 11:30 | 28 | 719 | 1217 | 1964 |
| 11:45 | 29 | 688 | 1410 | 2127 | 11:45 | 21 | 820 | 1339 | 2180 |
| 12:00 | 17 | 883 | 1430 | 2330 | 12:00 | 32 | 781 | 1364 | 2177 |
| 12:15 | 25 | 816 | 1420 | 2261 | 12:15 | 19 | 840 | 1391 | 2250 |
| 12:30 | 32 | 859 | 1366 | 2257 | 12:30 | 16 | 859 | 1362 | 2237 |
| 12:45 | 22 | 829 | 1432 | 2283 | 12:45 | 20 | 839 | 1433 | 2292 |
| 13:00 | 21 | 861 | 1369 | 2251 | 13:00 | 21 | 884 | 1419 | 2324 |
| 13:15 | 17 | 661 | 1219 | 1897 | 13:15 | 26 | 838 | 1080 | 1944 |
| 13:30 | 20 | 745 | 1175 | 1940 | 13:30 | 23 | 668 | 1120 | 1811 |
| 13:45 | 27 | 811 | 1131 | 1969 | 13:45 | 18 | 652 | 1312 | 1982 |
| 14:00 | 28 | 708 | 1288 | 2024 | 14:00 | 31 | 772 | 967 | 1770 |
| 14:15 | 15 | 739 | 997 | 1751 | 14:15 | 21 | 747 | 1177 | 1945 |
| 14:30 | 23 | 806 | 1167 | 1996 | 14:30 | 17 | 747 | 880 | 1644 |
| 14:45 | 17 | 653 | 1342 | 2012 | 14:45 | 24 | 730 | 1269 | 2023 |
| 15:00 | 30 | 729 | 1115 | 1874 | 15:00 | 18 | 704 | 1108 | 1830 |
| 15:15 | 32 | 658 | 943 | 1633 | 15:15 | 27 | 746 | 1237 | 2010 |
| 15:30 | 26 | 761 | 1042 | 1829 | 15:30 | 24 | 685 | 1008 | 1717 |
| 15:45 | 22 | 669 | 1281 | 1972 | 15:45 | 17 | 686 | 1180 | 1883 |
| 16:00 | 28 | 732 | 1098 | 1858 | 16:00 | 25 | 780 | 1240 | 2045 |
| 16:15 | 32 | 705 | 900 | 1637 | 16:15 | 24 | 657 | 1137 | 1818 |
| 16:30 | 26 | 751 | 1234 | 2011 | 16:30 | 25 | 771 | 1308 | 2104 |
| 16:45 | 16 | 797 | 920 | 1733 | 16:45 | 22 | 752 | 1129 | 1903 |
| 17:00 | 20 | 852 | 1449 | 2321 | 17:00 | 32 | 845 | 1418 | 2295 |
| 17:15 | 19 | 831 | 1435 | 2285 | 17:15 | 25 | 838 | 1423 | 2286 |
| 17:30 | 24 | 818 | 1415 | 2257 | 17:30 | Null | Null | Null | Null |
| 17:45 | 26 | 830 | 1454 | 2310 | 17:45 | Null | Null | Null | Null |
| 18:00 | 24 | 854 | 1435 | 2313 | 18:00 | Null | Null | Null | Null |

FIG.5

IMAGE-BASED VEHICLE CLASSIFICATION SYSTEM

CROSS-REFERENCE TO RELATED APPLICATION

This application claims priority of Taiwanese Invention Patent Application No. 106127881, filed on Aug. 17, 2017.

FIELD

The disclosure relates to a vehicle classification system and a vehicle classification method, and more particularly to an image-based vehicle classification system and an image-based vehicle classification method.

BACKGROUND

A conventional approach of measuring traffic flow, according to which traffic lights are to be controlled and coordinated to ensure safe and smooth traffic, is realized by counting vehicles manually on a road. However, the conventional approach is relatively inefficient and labor-intensive.

SUMMARY

Therefore, an object of the disclosure is to provide an image-based vehicle classification system and an image-based vehicle classification method that can alleviate at least one of the drawbacks of the prior art.

According to one aspect of the disclosure, the image-based vehicle classification system includes a camera and an image server. The camera is configured to capture a series of images of a road to result in an image stream and to transmit the image stream. The image server is electrically connected to the camera, and includes a communication interface and a processor. The communication interface is configured to receive the image stream from the camera and to transmit the image stream. The processor is electrically connected to the communication interface for receiving the image stream from the communication interface. The processor is configured to, for each of the images of the image stream, perform image segmentation on the image so as to result in a background portion, and a foreground portion that includes a plurality of vehicle image parts which respectively correspond to a plurality of vehicles. The processor is configured to perform, for each of the images of the image stream, a thinning process on the foreground portion to result in a thinned foreground portion. The processor is configured to perform, for each of the images of the image stream, an erosion process on the thinned foreground portion to remove at least one connection line between any overlapping two of the vehicle image parts so as to result in an eroded foreground portion where the vehicle image parts are separated from each other. The processor is configured to perform, for each of the images of the image stream, a dilation process on the vehicle images of the eroded foreground portion to result in a dilated foreground portion. The processor is configured to determine, for each of the images of the image stream, whether one of the vehicle image parts is crossing an imaginary line set in advance in the image for counting vehicles. The processor is configured to, for each of the images of the image stream, classify, by a neural network classifier when it is determined that one of the vehicle image parts is crossing the imaginary line, the one of the vehicle image parts into one of a large-size car class, a passenger car class and a motorcycle class.

According to another aspect of the disclosure, the image-based vehicle classification method is to be implemented by a system that includes a camera and an image server. The image server includes a communication interface and a processor. The image-based vehicle classification method includes following steps of:
  by the camera, capturing a series of images of a road to result in an image stream and transmitting the image stream;
  by the communication interface, receiving the image stream from the camera and transmitting the image stream;
  receiving, by the processor, the image stream from the communication interface; and
  for each of the images of the image stream, by the processor,
    performing image segmentation on the image so as to result in a background portion, and a foreground portion that includes a plurality of vehicle image parts which respectively correspond to a plurality of vehicles,
    performing a thinning process on the foreground portion to result in a thinned foreground portion,
    performing an erosion process on the thinned foreground portion to remove at least one connection line between any overlapping two of the vehicle image parts so as to result in an eroded foreground portion where the vehicle image parts are separated from each other,
    performing a dilation process on the vehicle image parts of the eroded foreground portion to result in a dilated foreground portion,
    determining whether one of the vehicle image parts is crossing an imaginary line set in advance in the image for counting vehicles, and
    classifying, by using a neural network classifier when it is determined that one of the vehicle image parts is crossing the imaginary line, the one of the vehicle image parts into one of a large-size car class, a passenger car class and a motorcycle class.

BRIEF DESCRIPTION OF THE DRAWINGS

Other features and advantages of the disclosure will become apparent in the following detailed description of the embodiment with reference to the accompanying drawings, of which:
FIG. 5 is a table exemplifying a result of vehicle counting obtained by the embodiment of the image-based vehicle classification system according to the disclosure.

DETAILED DESCRIPTION

Figure 1:
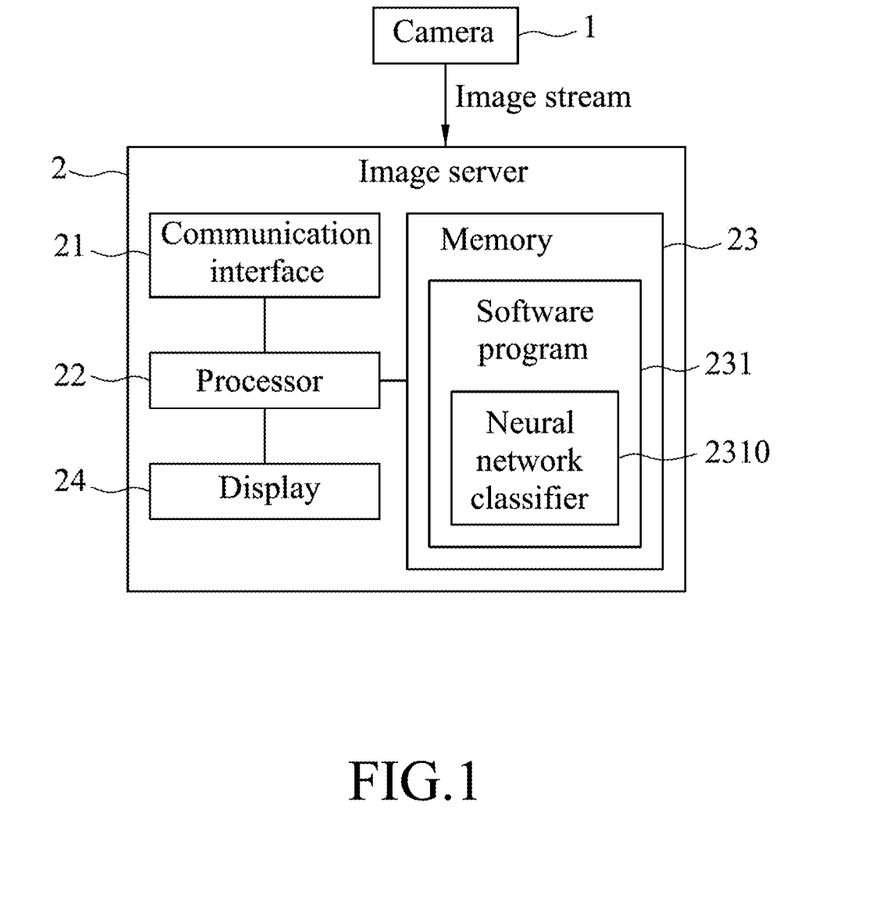
FIG. 1 is a block diagram illustrating an embodiment of an image-based vehicle classification system according to the disclosure.

Referring to FIG. 1, an embodiment of an image-based vehicle classification system according to the disclosure is illustrated. The image-based vehicle classification system includes a camera 1 and an image server 2.

The camera 1 is configured to capture a series of images of a road to result in an image stream and to transmit the image stream wirelessly to the image server 2 based on mobile communication technology, such as the fourth generation of broadband cellular network technology.

The image server 2 is electrically connected to the camera 1, and includes a communication interface 21, a processor 22, a memory 23 and a display 24.

The communication interface 21 is configured to receive the image stream from the camera 1 based on the mobile communication technology and to transmit the image stream to the processor 22.

The memory 23 is configured to store a software program 231 which is implemented to utilize a neural network classifier 2310 to perform image-based vehicle classification.

The processor 22 is electrically connected to the memory 23, the display 24, and the communication interface 21 for receiving the image stream from the communication interface 21. The processor 22 is configured to execute the software program 231 stored in the memory 23 so as to perform, on each of the images of the image stream, the image-based vehicle classification and vehicle counting. Details of the image-based vehicle classification and vehicle counting will be described in the following paragraphs.

The processor 22 is configured to perform image segmentation on each of the images of the image stream so as to result in a background portion and a foreground portion. The foreground portion includes a plurality of vehicle image parts which correspond respectively to a plurality of vehicles in the image. Among the vehicle image parts, at least one partly overlaps another (e.g., see boxes containing numbers 94, 57 and 102 in FIG. 3). In some cases, one or more of the vehicle image parts do not overlap with any other vehicle image part (e.g., see box containing number 142 in FIG. 3). In this disclosure, when two vehicle image parts are said to overlap, they may share a common edge (e.g., see boxes containing numbers 94 and 102 in FIG. 3) or have an overlapping portion (e.g., see boxes containing numbers 52 and 102 in FIG. 3). It is noted that any vehicle image part that overlaps with one or more other vehicle image parts may also be referred to hereinafter as "overlapping vehicle image part" and any vehicle image part that does not overlap with any other vehicle image parts may also be referred to hereinafter as "non-overlapping vehicle image part". In this embodiment, the image segmentation is implemented by the background reconstruction technique. However, implementation of the image segmentation is not limited thereto. For instance, the image segmentation may be implemented by at least one of the background reconstruction technique, a background subtraction technique or a moving object tracking technique.

In this embodiment, the background reconstruction technique is performed for each of the images of the image stream based on a probability of appearance p(y) of a pixel y in the image. The probability of appearance p(y) is calculated based on an equation of $p(y)=\Sigma_{j=1}^{K}\omega_j G(y,\mu_j,\Sigma_j)$, where K represents a quantity of mixture components in the image, $\omega_j$ represents an importance parameter of a $j^{th}$ one of the mixture components, and $G(y,\mu_j,\Sigma_j)$ represents a multivariate Gaussian distribution of the pixel y with mean $\mu_j$ and covariance $\Sigma_j$.

It is worth to note that for each of the images of the image stream, an image binarization threshold needs to be appropriately determined to perform image binarization on the image using the image binarization threshold thus determined so that the background portion and the foreground portion can be separated clearly from each other after image segmentation. However, determination of the image binarization threshold by labor is time consuming. In this embodiment, the processor 22 of the image server 2 is configured to perform statistical automatic thresholding algorithm (such as Otsu's method) so as to determine an image binarization threshold as the image undergoes image segmentation.

The processor 22 is configured to perform, for each image of the image stream, a thinning process on the foreground portion to result in a thinned foreground portion where boundaries between any overlapping pair of the overlapping vehicle image parts are thinned to become at least one connection line so as to eliminate any existing overlapping between vehicle image parts, which hinders vehicle counting (i.e., counting of vehicles present in one image of the image stream). As a result of the thinning process, the size of at least one of the vehicle image parts may decrease.

The processor 22 is configured to perform, for each image of the image stream, an erosion process on the thinned foreground portion to remove said at least one connection line so as to result in an eroded foreground portion where the vehicle image parts are separated from each other.

The processor 22 is configured to perform, for each image of the image stream, a dilation process on the vehicle image parts of the eroded foreground portion to result in a dilated foreground portion where areas of the vehicle image parts are expanded to their original sizes as in the image prior to the thinning process.

The processor 22 is configured to label the vehicle image parts and determine a width in pixels, a height in pixels, and an area that is the product of the width and the height of each of the vehicle image parts. Specifically speaking, in this embodiment, the processor 22 is configured to perform a row scan and/or a column scan on the dilated foreground portion, and to assign different numbers in sequence to respective independent areas, which are sequentially detected in the row scan and/or the column scan and which are represented in white color after the image binarization. The independent areas are separated from each other and represent respective vehicles. For example, a first independent area encountered while scanning is assigned a label one, and a second independent area encountered while scanning is assigned a label two, and so forth.

In this embodiment, the processor 22 is configured to identify and specify any of the vehicle image parts which has an area greater than thirty pixels by a rectangular frame, and to tag the identified vehicle image part by a number indicating the area thereof. Referring to an example shown in FIG. 3, the vehicle image parts which have areas greater than thirty pixels are specified by respective rectangular frames 241, 242, 243 and 244, and are tagged by respective numbers "142," "94," "102" and "57" for representing the areas of the vehicle image parts.

Figure 3:
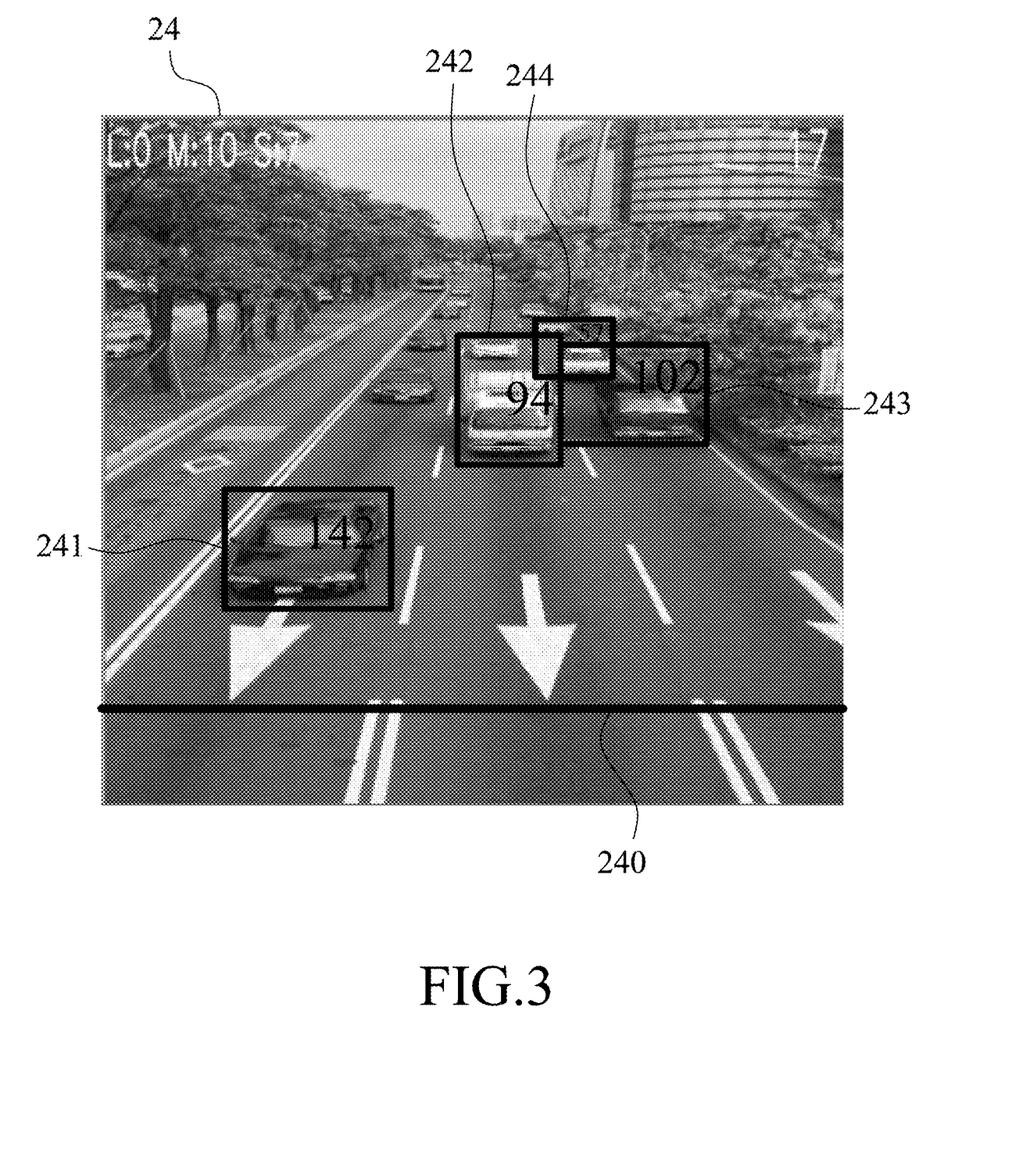
FIG. 3 is a schematic diagram illustrating an embodiment of displaying one image of an image stream.

The processor 22 is configured to determine, for each of the images of the image stream, whether one of the vehicle image parts is crossing an imaginary line 240 (as shown in FIG. 3) set in advance in the image for counting vehicles. In this embodiment, a vehicle image part whose center coincides the imaginary line 240 is determined to be crossing the imaginary line 240.

The processor 22 is configured to classify, by the neural network classifier 2310 when it is determined for any of the images of the image stream that one of the vehicle image parts thereof is crossing the imaginary line, the one of the vehicle image parts into one of a large-size car class, a passenger car class and a motorcycle class. It should be noted that in this embodiment, the large-size car class and the passenger car class are defined according to utilities; for instance, the large-size car class includes truck or bus, and the passenger car class includes a car for passengers. In other embodiments, they can be defined based on vehicle weight or vehicle dimensions. The neural network classifier 2310 may be implemented by a convolutional neural network (CNN) or a backpropagation neural network (BPN). In this embodiment, the processor 22 is configured to determine, by image processing, the width, the height and the area of each of the vehicle image parts that is crossing the imaginary line 240, and to classify, by the BPN, the vehicle image part into one of the large-size car class, the passenger car class and the motorcycle class.

Figure 4:
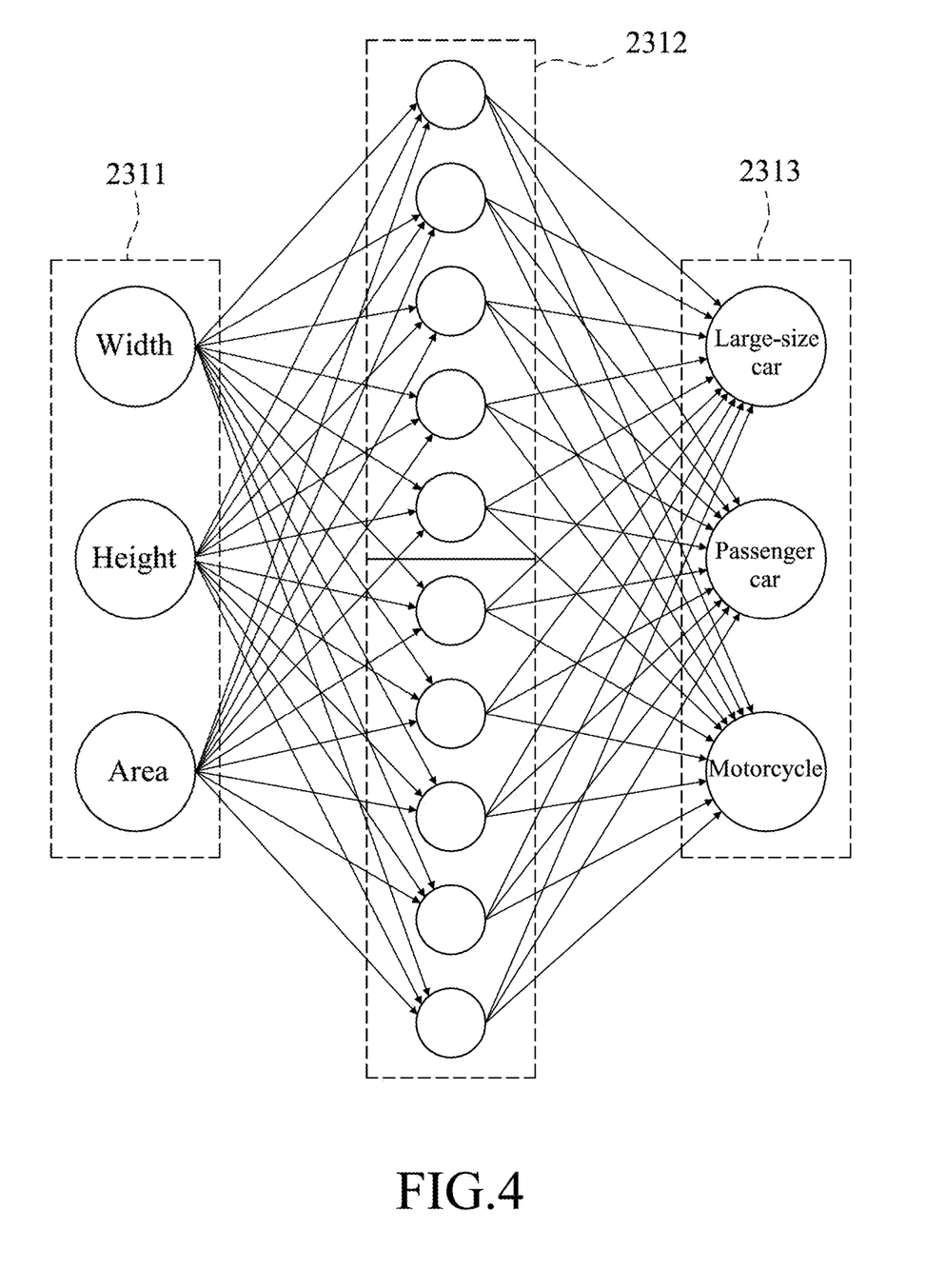
FIG. 4 is a schematic diagram illustrating an embodiment of a neural network classifier according to the disclosure.

Referring to FIG. 4, the BPN serves as the neural network classifier 2310 and includes an input layer 2311 including three input parameters, an output layer 2313 including three output parameters, and at least one hidden layer 2312 between the input layer 2311 and the output layer 2313. The input parameters include the width of the vehicle image part, the height of the vehicle image part, and the area of the vehicle image part. The output parameters include the large-size car class, the passenger car class and the motorcycle class. In this embodiment, said at least one hidden layer 2312 includes ten neurons, but implementation of a number of the neurons in the hidden layer 2312 is not limited thereto. The BPN has to be trained in advance, before being utilized to perform real-time classification on the image stream, by a great number of training samples each including a correspondence relationship between the size (i.e., the width, the height and the area) of a vehicle image part and a class to which a vehicle corresponding to the vehicle image part actually belongs (i.e., one of the large-size car class, the passenger car class and the motorcycle class).

It is worth to note that the BPN establishes nonlinear mapping between inputs and outputs through supervised learning. In this embodiment, an output vector Y can be obtained by Y=f(X*W), where X represents an input vector, W represents a weight matrix, and f(•) is an activation function and may be implemented by $$f(x) = \frac{1}{1 + \exp(-\alpha x)}$$

with a parameter α representing activity commonly used in the activation function of BPN. The parameter α may be set to 0.1.

Training of the BPN includes two phases, a feed-forward phase and a back-propagation phase. In the feed-forward phase where the weight matrix is kept constant, the input parameters included in the input vector are introduced into the input layer 2311, and then are weighted and summed at the hidden layer 2312, and are finally inputted into the activation function to result in the output parameters included in the output vector which will be outputted at the output layer 2313. In the back-propagation phase, the weight matrix is modified based on a result of an error function that is calculated according to differences between expected and actual values of the output vector. The expected value may be, for example, the class to which a vehicle corresponding to the vehicle image part actually belongs in the training sample. The result of the error function will be fed back to modify the weight matrix when the result of the error function is outside of a predetermined range. Therefore, the BPN can be trained with the training samples, and the weight matrix thereof can be consequently modified so that the actual values of the output vector converge to the expected values of the output vector.

The processor 22 is further configured to, after classifying the one of the vehicle image parts into one of the large-size car class, the passenger car class and the motorcycle class, add one to a count of vehicle image parts belonging to the one of the large-size car class, the passenger car class and the motorcycle class.

The display 24 is configured to display the image stream, and the count of vehicle image parts belonging to the large-size car class, the count of vehicle image parts the passenger car class and the count of vehicle image parts the motorcycle class. For example, the counts of vehicle image parts belonging to the classes are shown at an upper-left corner of one of the images of the image stream displayed by the display 24 in FIG. 3, where letters "L," "M" and "S" respectively represent the large-size car class, the passenger car class and the motorcycle class, and numbers following the letters respectively represent counts of vehicle image parts belonging to the corresponding classes. In other words, it is indicated that ten passenger cars and seven motorcycles have passed the imaginary line 240, while no large-size car has passed the imaginary line 240 as exemplified in FIG. 3. In addition, a total count of vehicles that have passed the imaginary line 240 is shown at an upper-right corner of the image displayed by the display 24, such as a number "17" shown in FIG. 3 which means a total of seventeen vehicles belonging to the three classes mentioned previously have passed the imaginary line 240.

FIG. 5 illustrates a table exemplifying a result of vehicle counting generated by the embodiment of the image-based vehicle classification system according to the disclosure. The result of vehicle counting is associated with traffic flow measured on a road in Taichung City on Jun. 27, 2017, and Jun. 28, 2017. Counts of vehicles belonging to the large-size car class, the passenger car class and the motorcycle class are respectively 3, 328 and 415 at 6:15 on Jun. 27, 2017.

Figure 2:
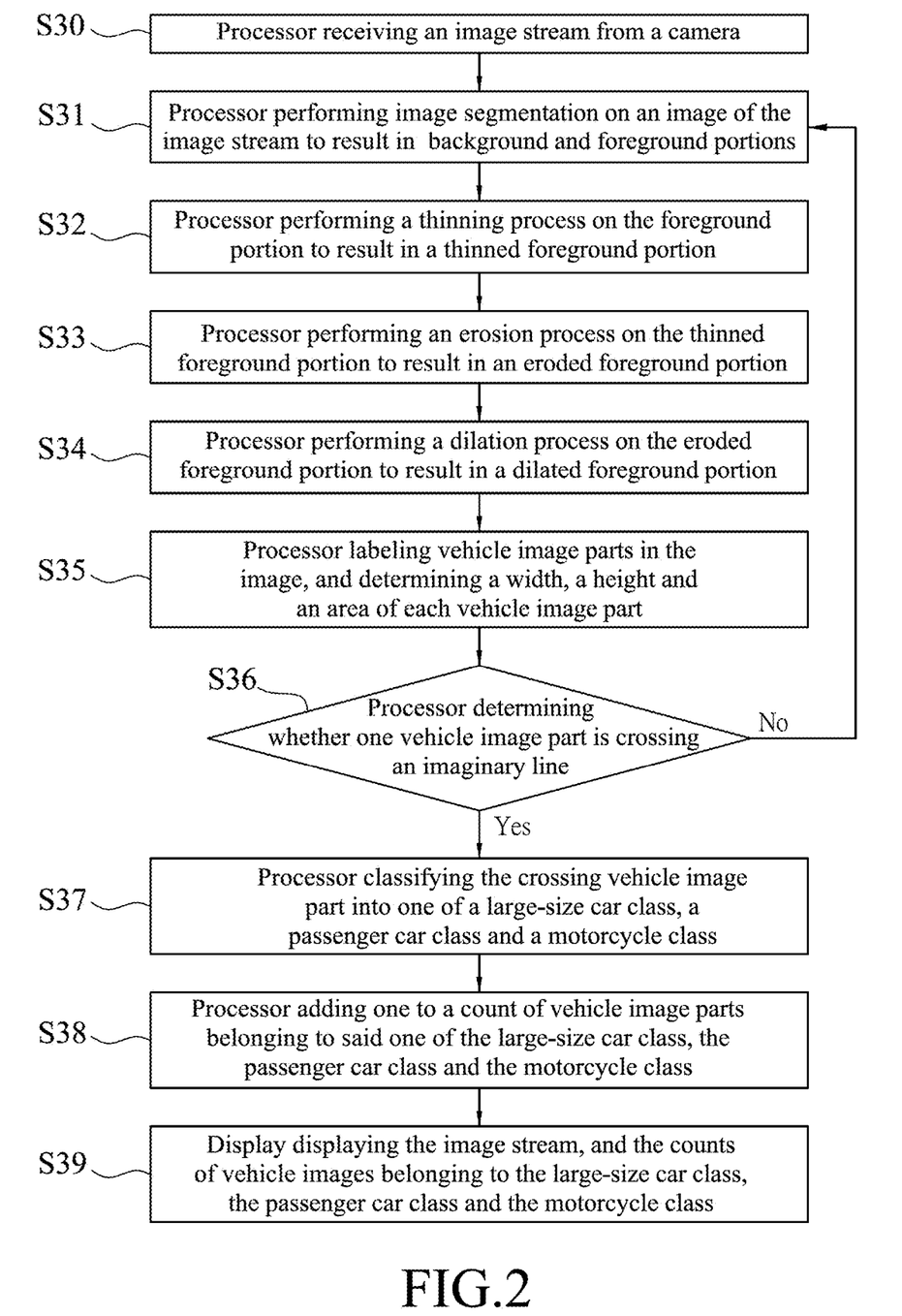
FIG. 2 is a flow diagram illustrating an embodiment of an image-based vehicle classification method according to the disclosure.

Referring to FIG. 2, an image-based vehicle classification method according to the disclosure is illustrated. The image-based vehicle classification method is to be implemented by the image-based vehicle classification system mentioned above. The image-based vehicle classification method includes steps S30-S39. Reference is further made to FIG. 1.

In step S30, the camera 1 continues to captures images of a road to result in the image stream and transmits the image stream to the image server 2. The communication interface 21 of the image server 2 receives the image stream from the camera 1 and transmits the image stream to the processor 22 of the image server 2 so as to enable the processor 22 to receive the image stream from the communication interface 21.

A procedure including steps S31 to S39 is performed for each of the images of the image stream.

In step S31, the processor 22 performs the image segmentation on the image so as to result in the background portion and the foreground portion. The foreground portion includes a plurality of vehicle image parts which respectively correspond to a plurality of vehicles.

In step S32, the processor 22 performs the thinning process on the foreground portion to result in the thinned foreground portion.

In step S33, the processor 22 performs the erosion process on the thinned foreground portion to remove at least one connection line between any overlapping two of the vehicle image parts so as to result in the eroded foreground portion where the vehicle image parts are separated from each other.

In step S34, the processor 22 performs the dilation process on the vehicle image parts of the eroded foreground portion to result in the dilated foreground portion.

In step S35, the processor 22 labels the vehicle image parts and determines the width, the height and the area, all in pixels, of each of the vehicle image parts.

In step S36, the processor 22 determines whether one of the vehicle image parts is crossing the imaginary line 240 set in advance in the image for counting vehicles.

In step S37, the processor 22 classifies, by using the neural network classifier 2310 when it is determined that one of the vehicle image parts is crossing the imaginary line 240, the one of the vehicle image parts into one of the large-size car class, the passenger car class and the motorcycle class.

In step S38, after classifying the one of the vehicle image parts into one of the large-size car class, the passenger car class and the motorcycle class, the processor 22 adds one to the count of vehicle image parts belonging to said one of the large-size car class, the passenger car class and the motorcycle class.

In step S39, the display 24 displays the image stream, and the counts of the vehicle image parts belonging to the large-size car class, the passenger car class and the motorcycle class.

In summary, by utilizing the image stream captured by the camera 1, the image-based vehicle classification system and method according to this disclosure perform automatic classification and automatic counting on the vehicle image parts in the image stream by the neural network classifier 2310. Therefore, automatic control of a traffic light can be realized based on the result of vehicle counting, saving manpower for traffic management.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An image-based vehicle classification system, comprising:
    a camera configured to capture a series of images of a road to result in an image stream and to transmit the image stream; and
    an image server electrically connected to said camera, and including
        a communication interface configured to receive the image stream from said camera and to transmit the image stream, and
        a processor electrically connected to said communication interface for receiving the image stream from said communication interface, and configured to, for each of the images of the image stream,
            perform image segmentation on the image so as to result in a background portion, and a foreground portion that includes a plurality of vehicle image parts which respectively correspond to a plurality of vehicles,
            perform a thinning process on the foreground portion to result in a thinned foreground portion,
            perform an erosion process on the thinned foreground portion to remove at least one connection line between any overlapping two of the vehicle image parts so as to result in an eroded foreground portion where the vehicle image parts are separated from each other,
            perform a dilation process on the vehicle image parts of the eroded foreground portion to result in a dilated foreground portion,
            determine whether one of the vehicle image parts is crossing an imaginary line set in advance in the image for counting vehicles, and
            classify, by a neural network classifier when it is determined that one of the vehicle image parts is crossing the imaginary line, the one of the vehicle image parts into one of a large-size car class, a passenger car class and a motorcycle class.

2. The image-based vehicle classification system as claimed in claim 1, wherein:
    said camera is configured to transmit the image stream wirelessly based on mobile communication technology; and
    said communication interface of said image server is configured to receive the image stream from said camera based on the mobile communication technology.

3. The image-based vehicle classification system as claimed in claim 1, wherein:
    said processor of said image server is configured to perform at least one of a background subtraction technique, a background reconstruction technique or a moving object tracking technique on each of the images of the image stream so as to result in the background portion and the foreground portion for the image.

4. The image-based vehicle classification system as claimed in claim 1, wherein:
    said processor of said image server is configured to, for each of the images of the image stream, perform statistical automatic thresholding algorithm so as to determine an image binarization threshold, based on which image binarization is performed on the image, as image segmentation is performed on the image.

5. The image-based vehicle classification system as claimed in claim 1, wherein the neural network classifier is a convolutional neural network (CNN).

6. The image-based vehicle classification system as claimed in claim 1, wherein the neural network classifier is a backpropagation neural network (BPN).

7. The image-based vehicle classification system as claimed in claim 6, wherein:
    the BPN includes an input layer including three input parameters, an output layer including three output parameters, and at least one hidden layer between the input layer and the output layer, the input parameters including a width of the vehicle image part, a height of the vehicle image part, and an area of the vehicle image part that is the product of the width and the height of the vehicle image part, the output parameters including the large-size car class, the passenger car class and the motorcycle class.

8. The image-based vehicle classification system as claimed in claim 7, wherein said at least one hidden layer includes ten neurons.

9. The image-based vehicle classification system as claimed in claim 1, wherein said processor is further configured to, after classifying the one of the vehicle image parts into one of the large-size car class, the passenger car class and the motorcycle class, add one to a count of vehicle image parts which have been classified as said one of the large-size car class, the passenger car class and the motorcycle class.

10. The image-based vehicle classification system as claimed in claim 9, further comprising:
a display electrically connected to said processor, and configured to display the image stream, and the counts of vehicle image parts belonging to the large-size car class, the passenger car class and the motorcycle class.

11. An image-based vehicle classification method to be implemented by a system that includes a camera and an image server, the image server including a communication interface and a processor, the image-based vehicle classification method comprising steps of:
by the camera, capturing a series of images of a road to result in an image stream, and transmitting the image stream;
by the communication interface, receiving the image stream from the camera and transmitting the image stream;
receiving, by the processor, the image stream from the communication interface; and
for each of the images of the image stream, by the processor,
performing image segmentation on the image so as to result in a background portion, and a foreground portion that includes a plurality of vehicle image parts which respectively correspond to a plurality of vehicles,
performing a thinning process on the foreground portion to result in a thinned foreground portion,
performing an erosion process on the thinned foreground portion to remove at least one connection line between any overlapping two of the vehicle image parts so as to result in an eroded foreground portion where the vehicle image parts are separated from each other,
performing a dilation process on the vehicle image parts of the eroded foreground portion to result in a dilated foreground portion,
determining whether one of the vehicle image parts is crossing an imaginary line set in advance in the image for counting vehicles, and
classifying, by using a neural network classifier when it is determined that one of the vehicle image parts is crossing the imaginary line, the one of the vehicle image parts into one of a large-size car class, a passenger car class and a motorcycle class.

12. The image-based vehicle classification method as claimed in claim 11, wherein:
the transmitting the image stream includes wirelessly transmitting, by the camera, the image stream based on mobile communication technology; and
the receiving the image stream includes receiving, by the communication interface of the image server, the image stream from the camera based on the mobile communication technology.

13. The image-based vehicle classification method as claimed in claim 11, wherein:
the performing image segmentation includes performing, by the processor of the image server, at least one of a background subtraction technique, a background reconstruction technique or a moving object tracking technique on the image so as to result in the background portion and the foreground portion.

14. The image-based vehicle classification method as claimed in claim 11, wherein:
the performing image segmentation includes performing, by the processor of the image server, statistical automatic thresholding algorithm so as to determine an image binarization threshold, based on which image binarization is performed on the image during performing image segmentation on the image.

15. The image-based vehicle classification method as claimed in claim 11, wherein the neural network classifier is a convolutional neural network (CNN).

16. The image-based vehicle classification method as claimed in claim 11, wherein the neural network classifier is a backpropagation neural network (BPN).

17. The image-based vehicle classification method as claimed in claim 16, wherein:
the BPN includes an input layer including three input parameters, an output layer including three output parameters, and at least one hidden layer between the input layer and the output layer, the input parameters including a width of the vehicle image part, a height of the vehicle image part, and an area of the vehicle image part that is the product of the width and the height of the vehicle image part, the output parameters including the large-size car class, the passenger car class and the motorcycle class.

18. The image-based vehicle classification method as claimed in claim 17, wherein said at least one hidden layer includes ten neurons.

19. The image-based vehicle classification method as claimed in claim 11, further comprising, after classifying the one of the vehicle image parts into one of the large-size car class, the passenger car class and the motorcycle class, a step of:
adding one to a count of vehicle image parts belonging to said one of the large-size car class, the passenger car class and the motorcycle class.

20. The image-based vehicle classification method as claimed in claim 19, further comprising:
displaying, by a display electrically connected to the processor, the image stream, and the counts of the vehicle images belonging to the large-size car class, the passenger car class and the motorcycle class.

* * * * *